United States Patent [19]
Piccione

[11] 3,825,866
[45] July 23, 1974

[54] SYSTEM AND APPARATUS FOR UNDERGROUND TRANSFORMER INSTALLATION

[76] Inventor: Nicholas E. Piccione, 28 Stengel Pl., Smithtown, N.Y. 11787

[22] Filed: June 29, 1972

[21] Appl. No.: 267,275

[52] U.S. Cl. .................................. 337/17, 337/407
[51] Int. Cl. ............................................ H01h 71/20
[58] Field of Search ................ 337/15, 17, 407, 412

[56] References Cited
UNITED STATES PATENTS
3,309,481  3/1967  Merrill ............................ 337/407 X
3,594,750  7/1971  Mueller ............................ 337/17 X OTHER PUBLICATIONS
N. E. Piccione, "Shunt Device Guards Isolated Tank of Buried Transformers," Electrical World, July 1, 1971, p. 48.

Primary Examiner—James D. Trammell
Attorney, Agent, or Firm—Albert C. Nolte, Jr.; Edward B. Hunter; C. Bruce Hamburg

[57]  ABSTRACT

In an underground distribution transformer system the tank of the transformer is connected to a protective grounded anode, and is connected to the system neutral only by way of a voltage responsive shunt bypass. The shunt bypass is comprised of an encapsulated device including a lead disk connected to one terminal thereof and separated from another lead disk connected to the other terminal thereof by a Mylar disk having a central aperture. Spring loading is provided in the device for urging the lead disks together when they are melted due to arc-over currents in the gap defined by the Mylar disk.

3 Claims, 6 Drawing Figures

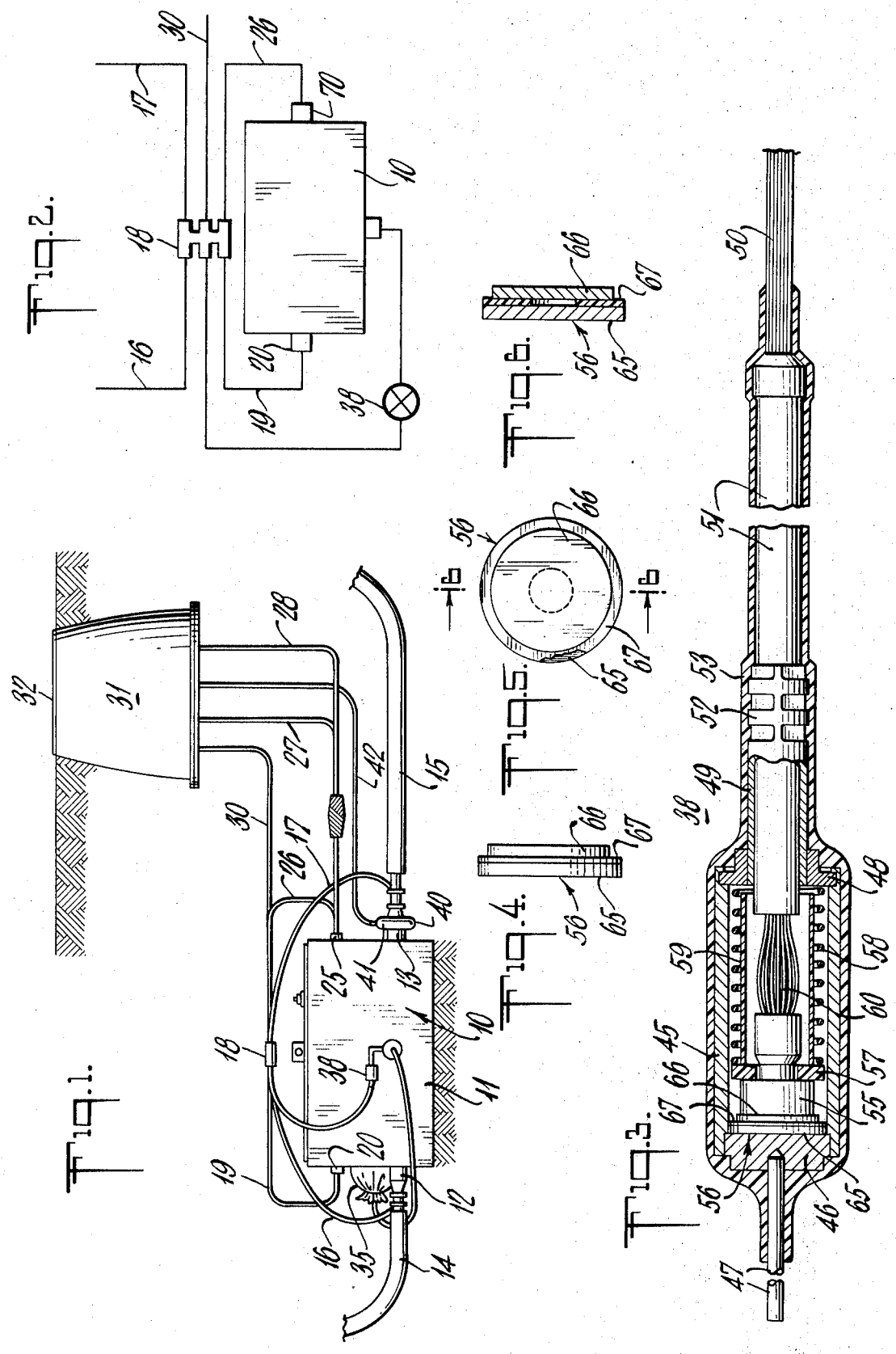

SYSTEM AND APPARATUS FOR UNDERGROUND TRANSFORMER INSTALLATION

This invention relates to underground distribution transformer devices and systems, and is more particularly directed to corrosion protection systems for underground distribution apparatus such as transformers or the like and personnel protection devices for use therewith.

While the invention is particularly concerned with residential underground distribution systems employing direct buried transformers, it will be apparent that the invention may be employed in similar systems without departing from the spirit and scope of the invention.

In the past it has been common to mount distributuin transformers, such as distribution transformers, on poles in residential areas. In order to avoid the aesthetic unacceptability of such arrangements, the trend has been toward the installation of such systems, including the distribution transformers, below the ground. In one solution of this problem, submersible units have been provided, with the transformers, for example, being installed in underground vaults. Previous solutions to the problem, while overcoming the aesthetic unacceptability of pole mounted systems, have introduced problems in safety, corrosion, ventilation, maintenance, fire, and possible explosion.

In accordance with the invention, it has been found that the direct burying of distribution transformers and the like overcomes all of these problems, when conventional techniques are employed, with the exception of corrosion. In conventional practice, however, the tank of a distribution transformer is connected to the system neutral, and as a consequence it has been found that the tank of the transformer served in the galvanic protection of the entire neutral system. The resulting corrosion of the tank has been found to be unacceptable for a direct buried transformer, since such an arrangement would require frequent maintenance and inspection, and is hence not consistent with the maintenance free requirements of direct burial.

In order to overcome this problem, in accordance with the invention, the transformer tank is normally separated electrically from the system neutral, and is electrically connected to the ground, for example by way of a suitable protective anode buried in the ground. As a consequence, it has been found that the sacrificial anode provides adequate corrosion protection for the tank that the system may be adequately maintenance free for direct burial. While this system therefore solves the problem of corrosion, it does introduce a possible problem in the field of personnel safety. For example, if a fault should occur in the transformer, it is possible that a potentially dangerous voltage may be applied to the tank. If this voltage is present at a time that personnel are digging in the area of the tank, either for purposes of maintenance or accidently, it is conceivable that serious results may occur to the personnel if the tank is contacted. In order to overcome this problem, in accordance with the invention, a shunt bypass device is provided connected between the system neutral and the transformer tank. The shunt bypass device serves to establish an electrical connection between the tank and the system neutral when the voltage therebetween exceeds a predetermined magnitude, for example 100 volts or higher.

In the provision of such a shunt bypass device, it is necessary that the device be maintenance free and reliable, since it is directly buried in the ground. For this purpose, in accordance with the invention, the shunt bypass device comprises an encapsulated unit having one lead adapted to be affixed to the transformer tank and another lead connected to the system neutral. The device includes a lead disk connected to one terminal thereof, and a second lead disk electrically connected to the other terminal thereof. The two lead disks are separated by an insulating washer, for example a Mylar washer, so that when voltage of the predetermined magnitude occurs an arc will occur between the two disks, thereby melting the disks and fusing the connections together. The insulating washer is selected to have a thickness which establishes the desired arc-over potential. The lead disks are urged together by a spring within the device acting on one of the contacts connected to a lead disk, to insure the maintenance of a fixed bond between the terminals of the device once an arc-over has occurred.

In order that the invention will be more clearly understood, it will now be described in greater detail with reference to the accompanying drawing, in which:

FIG. 1 is a schematic illustration of a direct buried transformer system according to the invention;

FIG. 2 is a schematic illustration of the netural system of the arrangement of FIG. 1;

FIG. 3 is a cross-sectional view of a shunt bypass device in accordance with the invention;

FIG. 4 is a side view of the lead disk-insulating washer sandwich arrangement of the device of FIG. 3;

FIG. 5 is an end view of the device of FIG. 4; and

FIG. 6 is a cross-sectional view of the device of FIG. 5 taken along the lines 6—6.

Referring now to the drawings, and more in particular to FIG. 1, therein is illustrated a direct burial residential underground distribution system in accordance with the invention. In this arrangement, a transformer 10 having a tank 11 is directly buried in the ground. The tank 11 is not electrically connected to the components within the tank. The transformer 10 is provided with a pair of primary bushings 12 and 13 which may be positioned on opposite sides of the tank as illustrated. These bushings are directly connected to each other internally of the tank, so that the central lead of a buried high voltage cable 14 connected to the bushing 12 is directly connected to the central conductor of a high voltage cable 15 connected to the bushing 13. The neutrals 16 and 17 of the cables 14 and 15 respectively are connected together by an external connector 18, and this connector is also connected by way of lead 19 to a bushing 20 for the primary neutral in the transformer (which is not connected to the tank). Internally of the tank 11, the primary winding system (not shown) is connected by conventional techniques between the primary neutral bushing 20 and the internal connection between the bushings 12 and 13, to form the primary circuit.

A plurality of bushings are also provided for the secondary circuit, only one, indicated by the numeral 25 being illustrated, the others being positioned in line behind the bushing 25. One of the secondary bushings (i.e., bushing 70 in FIG. 2), corresponding to the secondary neutral, is connected by way of lead 26 to the connector 18, and the other secondary bushings are separately connected to secondary cables 27 and 28 as illustrated. Thus, the secondary cables 27 and 28 are connected to separate secondary bushings, and the lead 26 is connected to a secondary neutral bushing. Internally of the tank 11, conductors connected to the secondary neutral lead 26, and secondary cables 27 and 28, are interconnected to the conventional secondary winding circuit (not shown in the desired fashion.

The secondary cables 27 and 28, and a furtHer cable 30 also connected to the connector 18, are led to a suitable splice box 31 which is accessible from the ground level, for permitting connection of the secondary circuit, for example, to the entrance cable of a residence (not shown). This connection may be made in conventional fashion. The splice box may, for example, be of plastic, and have a suitable cover 32 for access from grade level.

In the illustrated arrangement, for example, the cable 14 may be a high voltage cable which extends underground to a further arrangement similar to that illustrated in FIG. 1, or to a power source, and the cable 15 may proceed from the transformer 10 to further similar installations. This cable may be a 4,160 volt single phase cable, or have other conventional primary voltage, and in the usual practice the secondary windings will provide the usual 240/120 voltage for residential wiring. These voltages are exemplary only, and it will be obvious that the system may be adapted to other voltages.

As above noted, the tank 11 is not connected to the system neutral. This tank, which may for example be of steel protected with suitable coatings, is protected against galvanic corrosion by being connected to a sacrificial anode 35, for example by way of lead 36 connected to the metal of the tank by suitable means. The tank is thus electrically isolated to effect its working of a cathotic protective circuit including the sacrificial anode. The tank and earth are connected thus only through the protective anode. The material of which the anode is made is selected on the basis of soil resistivity at the transformer location. For example, zinc may be employed in areas of low resistivity, an magnesium employed in areas of high resistivity. In the illustrated embodiment, the sacrificial anode may be magnesium, for example magnesium, such as magnesium rods, surrounded by coke to increase the conductivity to earth and initially installed in a water permeable bag, for example of cotton cloth. The bag and cake are initially wetted when the bag is buried with the transformer to insure adequate connection to the earth. The cloth may of course disintegrate after a time in the earth. In FIG. 1 the anode 35 is illustrated as partially behind the transformer, although it will be understood that any placement thereof within the hole in which the transformer is located will be satisfactory.

While this arrangement has been found to provide effective corrosion protection, there is a possibility that it may introduce a potential hazard to personnel. For example, a fault may occur within the transformer that causes the transformer tank to become energized, and if the fault is of sufficiently high impedance it may not result in a fault current great enough to trip circuit protecting devices, due to the high impedance between the tank and the system neutral. Consequently, the tank may remain at a potential high enough to be dangerous to anyone who might come in contact with it.

In order to avoid this problem, the tank is connected to the system neutral at connector 18 by a shunt bypass device 38. This device, which will be explained in greater detail in the following paragraphs, can be preset for any voltgae, for example from 90 volts to the full operating voltage of the transformer, so that if a potential occurs on the tank for any reason, and the potential is above the preset value of the device, the device 38 operates to form a permanent short circuit between the tank and the system neutral. This interconnection immediately causes conventional line protection devices connected to the system (not shown) to actuate to clear the fault. The permanent connection by the shunt bypass device prevents reenergization of the system by cycling breakers or accidental circuit reclosure.

If desired, a fault indicating device 40 may be provided in the system to enable the indication of fault in the system. This arrangement, which may be of the type disclosed in copending application Ser. No. 104,102, filed Jan. 5, 1971, now U.S. Pat. No. 3,771,049 includes a sensing transformer 41 coupled to the transmission cable, for example cable 15, the secondary of the transformer 41 being connected by way of cable 42 to a suitable indicator (not shown) in the splice box 31.

The neutral system of the arrangement of FIG. 1 is illustrated in the schematic diagram of FIG. 2. Therein it is seen that the conductors 16, 17, 19, 26 and 30 are connected to the connector 18, and the tank 11 is connected to the connector 18 by way of the shunt bypass device 38.

FIG. 3 illustrates an embodiment of the shunt bypass device 38 in accordance with the invention. Referring now to this Figure, a conductive tube 45, for example of copper, is provided at one end with a conductive plug or contact disc 46 to which a grounding pigtail 47, for example solid copper wire, is brazed or otherwise suitably attached. The pigtail 47 is adapted to be connected to the transformer tank by any conventional technique. The other end of the tube 45 is provided with a conductive plug 48 having a central aperture, and a conductive tube shroud 49, for example of copper, is conductively affixed, for example by brazing, in the aperture in the plug 48, so that the shroud 49 extends outwardly axially from the respective end of the device. The plugs 46 and 48 are conductively held to the tube 45 by suitable manner, such as roll staking.

A flexible lead 50, for example of stranded copper, is provided for connection for example to the connector 18 of FIG. 1. The lead 50 extends through the shroud 49, and is separated therefrom by a suitable insulation layer 51. In order to hold the lead 50 in the shroud 49, the shroud 49 may be crimped on the insulation 51, as illustrated at 52 in the Figure. The conductor 50 is thus rigidly held in the end of the device. The entire device 38 is provided with a weather and water seal protection insulating cover 53, such as may be provided by a heat shrinkable tubing.

Within the tube 45, the end of the lead 50 is connected to a conductive contact disk 55, and a fusible element 56 is held between the end of the contact disk 55 in the inside surface of the plug 46. For this purpose, an insulating thrust washer 57 is provided abutting the opposite surface of the disk 55, and a helical compression spring 58 is provided extending between the plug 48 and the thrust washer 57 to urge the contact disk 55 against the element 56, thereby firmly holding the element 56 between the contact disk 55 and the plug 46. In order to insure isolation between the lead 50 and the spring 58 within the device, a tubular insulating sleeve 59 is provided surrounding the lead 50 and extending generally from the first washer 57 to the plug 48. Within the tube 45 the flexible lead 50 is cambered, or the strands thereof are somewhat spread out, so that the lead in this region will have some axial flexure. This is indicated at numeral 60.

The fusible element 56 is comprised of a lead disk 65 abutting the plug or contact disk 46, a lead disk 66 abutting the contact disk 55, and an insulating washer 67 sandwiched between the lead disks 65 and 66. The structure of the fusible element is illustrated more clearly in FIGS. 4-6, wherein it is seen that the insulating washer 67 has a central aperture and thereby spaces the lead disks apart a defined distance to provide an air gap. The insulating washer 67 is preferably of a film, such as Mylar, and the thickness of this film is selected to provide the desired arc-over voltage of the device as above noted. For example, in one embodiment of the invention, the lead disk 65 had a diameter of 0.8125 inches and a thickness of 0.093 inches, the lead disk 66 had a diameter of 0.6875 inches and a thickness of 0.063 inches, and the washer 67 was a Mylar disk with an outside diameter of 0.813 inches, a central aperture with a diameter of 0.25 inches, and a thickness of 0.0075 inches. These dimensions are of course exemplary only, and merely illustrate a typical embodiment of the invention.

In operation, the lead disks 65 and 66 are normally held apart by the washer 67, so that the tank of a transformer or the like is normally isolated from the system neutral. When the potential between the pigtail 47 and lead 50 exceeds the arc-over potential of the air gap between the lead disks, as determined by the thickness of the washer 67, an arc is formed and effects the melting of the lead disks. When the lead disks are thus melted, the contact disk 55 is urged to force the lead together under the action of the spring 58, to form a solid electrical interconnecting bond between the contact disk 55 and the plug or contact disk 46 and tube 45, thereby providing a permanent bond between the grounding pigtail 47 and the lead 50.

While the dimensions of the components of the device 38 are not critical, except perhaps insofar as the thickness of the disk 67 is concerned with respect to the predetermined voltage protection level, it should be pointed out that the components within the device, such as the pigtail 47 and lead 50, as well as the contact disk 55 and plug 46 must be suitably dimensioned to have a conducting capacity that is equal to or greater than the current carrying capability of the service leads in the system, so that upon reclosing of any of the feeder circuits in the system, the device will repeatedly handle all fault currents. The device according to the invention is thus immediately responsive to provide a shunt bypass between the transformer tank and the system neutral in order to safeguard personnel working on or in the vicinity of a direct buried transformer whose tank is off ground or off neutral service potential. The fused lead disks complete a solid path to ground, causing line protected devices to clear the protected transformer from the line. In a series of tests with the above example of dimensions of lead disks and Mylar washers with the pigtail 47 and lead 50 being No. 6 AWG copper, the device repeatedly withstood a current of 10,000 amperes symmetric, at 7,620 volts, 60 hertz.

While the transformer 10 has been shown with the primary bushings at opposite ends thereof, a particularly advantageous arrangement is produced by employing both primary high voltage bushings and primary neutral at one end, with the secondary bushings at the other end. With this arrangement, the high voltage cables can be buried in a trench, for example with telephone lines under a road, a loop being left in the high voltage cable to permit later installation of the transformer, for example on the opposite side of the curb, with the primary bushings facing the curb. The transformer is hermetically sealed, and may be expendable in the event of failure.

While the invention has been described and disclosed with reference to a single embodiment thereof, it will be apparent that many modifications and variations may be made therein without departing from the invention, and it is therefore intended in the following claims to cover each such variation and modification as falls within the true spirit and scope of the invention.

What is claimed is:

1. An electric device having first and second normally electrically isolated terminals, and means for establishing a permanent electrical connection between said terminals upon the occurrence of an electric potential above a predetermined magnitude between said terminals, said means comprising a first contact connected to said first terminal, a second contact connected to said second terminal, a fusible element between said first and second contacts, and spring means urging said contacts together to compress said fusible element therebetween, said fusible element comprising a first lead disk contacting said first contact, a second lead disk contacting said second contact, an insulating washer between said first and second lead disks and electrically separating them, said washer defining an air gap between said lead disks, whereby electric potentials between said potentials above said predetermined magnitude affects an arc across said gap to melt said lead disks.

2. An electrical device comprising a conductive tube, a conductive plug in one end of said tube and forming one terminal of said device, a flexible lead positioned to extend into the other end of said tube, said flexible lead forming a second terminal of said device, means for rigidly holding said flexible lead in insulated relationship in said other end of said tube, a contact disk within said tube and electrically connected to the end of said lead therewithin and electrically insulated from said tube, a fusible element between said contact disk and said plug, and helical spring means surround said flexible lead within said tube and urging said contact disk into engagement with said fusible element, said fusible element comprising a first lead disk in contact with said plug, a second lead disk in contact with said contact disk, and an insulating washer between said first and second lead disks and holding said lead disks out of electrical connection, said insulating washer forming an air gap between said lead disks.

3. The device of claim 2 in which said insulating washer is a Mylar washer.

* * * * *